(12) United States Patent
Larson et al.

(10) Patent No.: US 11,520,115 B2
(45) Date of Patent: Dec. 6, 2022

(54) CABLE SEALING DEVICE

(71) Applicant: Corning Research & Development Corporation, Corning, NY (US)

(72) Inventors: Donald Kent Larson, Cedar Park, TX (US); Michel Teva Menguy, La Chevallerais (FR)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/107,754

(22) Filed: Nov. 30, 2020

(65) Prior Publication Data
US 2021/0080667 A1     Mar. 18, 2021

Related U.S. Application Data

(63) Continuation of application No. PCT/US2019/034268, filed on May 29, 2019.

(60) Provisional application No. 62/677,765, filed on May 30, 2018.

(51) Int. Cl.
| | |
|---|---|
| *G02B 6/38* | (2006.01) |
| *G02B 6/44* | (2006.01) |
| *H02G 15/007* | (2006.01) |
| *H02G 15/013* | (2006.01) |

(52) U.S. Cl.
CPC ......... *G02B 6/4444* (2013.01); *G02B 6/3807* (2013.01); *G02B 6/3826* (2013.01); *G02B 6/4477* (2013.01); *H02G 15/007* (2013.01); *H02G 15/013* (2013.01)

(58) Field of Classification Search
CPC .............. G02B 6/38875; G02B 6/3831; G02B 6/3836; G02B 6/3807; G02B 6/38
See application file for complete search history.

(56) References Cited

U.S. PATENT DOCUMENTS

| | | |
|---|---|---|
| 6,487,344 B1 | 11/2002 | Naudin et al. |
| 8,270,799 B2 | 9/2012 | Drouard |
| 8,313,250 B2 * | 11/2012 | Drouard .................. H02G 3/22 |
| | | 385/136 |

(Continued)

OTHER PUBLICATIONS

International Search Report and Written Opinion of the International Searching Authority; PCT/US2019/034268; dated Sep. 13, 2019; 11 pages; European Patent Office.

(Continued)

*Primary Examiner* — Eric Wong
(74) *Attorney, Agent, or Firm* — Tamika A. Crawl-Bey

(57) ABSTRACT

In a first embodiment, cable sealing device is described herein for use in a port structure of fiber terminal, telecommunication enclosure, or a bulkhead. The exemplary cable sealing device comprises a unibody construction comprising a rigid body portion, the rigid portion having a generally tubular shape that includes an interior passageway extend from a first end to a second end of the rigid body portion; and an elastomeric body portion over molded onto and extending from an end of the rigid body portion, the elastomeric body portion comprises a front end having an interior sleeve that extends into interior passageway at the second end of rigid body portion and an exterior sealing sleeve that is formed over the second end of rigid body portion, and a closed end disposed opposite the open end, wherein the closed end includes a removable portion.

19 Claims, 16 Drawing Sheets

(56) References Cited

U.S. PATENT DOCUMENTS

| | | | |
|---|---|---|---|
| 9,640,966 B1* | 5/2017 | Smith | H02G 15/117 |
| 2010/0086260 A1 | 4/2010 | Parikh et al. | |
| 2014/0133823 A1 | 5/2014 | Simmons et al. | |
| 2015/0253528 A1 | 9/2015 | Drouard et al. | |
| 2018/0003910 A1 | 1/2018 | Menguy | |
| 2019/0302374 A1* | 10/2019 | Lee | H01R 27/00 |
| 2019/0353852 A1* | 11/2019 | Lee | G02B 6/3871 |
| 2021/0003789 A1* | 1/2021 | Hsu | G02B 6/3885 |
| 2021/0151905 A1* | 5/2021 | Novak | H01R 13/6592 |
| 2021/0373251 A1* | 12/2021 | Baca | G02B 6/3849 |

OTHER PUBLICATIONS

European Patent Application No. 19731834.8, Communication under Rule 71(3) EPC, dated Feb. 23, 2022; 68 pages; European Patent Office.

* cited by examiner

CABLE SEALING DEVICE

PRIORITY APPLICATION

This application claims the benefit of priority to International Application No. PCT/US2019/034268, filed May 29, 2019, and U.S. Patent Application No. 62/677,765, filed May 30, 2018, the contents of which are each relied upon and incorporated herein by reference in their entirety.

FIELD

The present invention relates to a cable sealing device used to environmentally seal the port of an optical fiber splice enclosure or bulkhead before and after a service connection is made. In particular, the exemplary cable sealing device includes a removable portion in a closed end of the sealing device to allow insertion of an optical fiber cable there through.

BACKGROUND

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced and connected to other cables or "branches" of the telecommunication network. At each point where a telecommunication cable is opened, it is necessary to provide a telecommunication enclosure to protect the exposed interior of the cable. Telecommunication enclosures typically have a plurality of cable entry ports which need to be sealed before and after installation of a cable through the port to ensure protect the interior of the enclosure from moisture and debris.

Today, a water proof plug is typically used to seal a cable port prior to cable installation through the port and a cable inlet device can be used to seal the cable entry port after cable installation. Exemplary cable inlet devices include the 3M™ External Cable Assembly Modules available from 3M Company (St. Paul, Minn.), such as shown in FIG. 1 are described in U.S. Pat. No. 8,313,250. The inlet device 10 comprising a plurality of separate parts including a housing 11 having a first end and a second end, an internal sealing member 14 shaped to be received within the second end of the housing, and a compression member attachable to the second end of the housing. The compression member comprising a cable securing device 16, a clamping nut 15 and/or other device capable of applying a radial force to the second end of the inlet device housing.

Conventional port sealing devices are typically sold separately from the telecommunication enclosure as a kit of parts that are assembled and added into the cable port only when a cable needs to enter the enclosure. These cable entry sealing kits may comprise many separate parts which need to be managed at the job site as well as excess parts to enable use with a range of cable sizes, but these excess parts can also introduce additional cost into the cable entry sealing kits.

With the rapid deployment of FTTx networks, service providers are asking for complete telecommunication enclosure solutions that are affordable and easy to use.

SUMMARY

In a first embodiment, cable sealing device is described herein for use in a port structure of fiber terminal, telecommunication enclosure, or a bulkhead. The exemplary cable sealing device comprises a unibody construction comprising a rigid body portion, the rigid portion having a generally tubular shape that includes an interior passageway extend from a first end to a second end of the rigid body portion; and an elastomeric body portion over molded onto and extending from an end of the rigid body portion, the elastomeric body portion comprises a front end having an interior sleeve that extends into interior passageway at the second end of rigid body portion and an exterior sealing sleeve that is formed over the second end of rigid body portion, and a closed end disposed opposite the open end, wherein the closed end includes a removable portion.

In a second embodiment, cable sealing device comprises a unibody construction comprising a rigid body portion, the rigid portion having a generally cylindrical shape that includes an interior passageway extend from a first end to a second end of the rigid body portion; and an elastomeric body portion over molded onto and extending from an end of the rigid body portion, the elastomeric body portion comprises a front end having an exterior sealing sleeve that is formed over the second end of rigid body portion, an elastomeric tongue extending from the front end of the elastomeric body portion and through the interior passageway in the rigid body portion, and a closed end disposed opposite the open end, wherein the closed end includes a removable portion.

In a third embodiment, a method of making a service connection is described. The method comprising providing a fiber terminal having a plurality of ports, and a cable sealing device removably disposed in the at least one of the plurality of ports, wherein the sealing device has a unibody construction comprising a rigid body portion, the rigid portion having a generally tubular shape that includes an interior passageway extend from a first end to a second end of the rigid body portion and an elastomeric body portion connected to the second end of the rigid body portion, the elastomeric body portion having a closed end at an end opposite the rigid body portion, wherein the closed end includes a removable portion; extracting the sealing device from the port by exerting an extraction force away from the fiber terminal; tearing the removable portion away from the closed end of the sealing device to create an insertion opening; inserting the terminal end of a cable through the insertion opening of the sealing device; and installing the sealing plug back into one of the plurality of ports.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
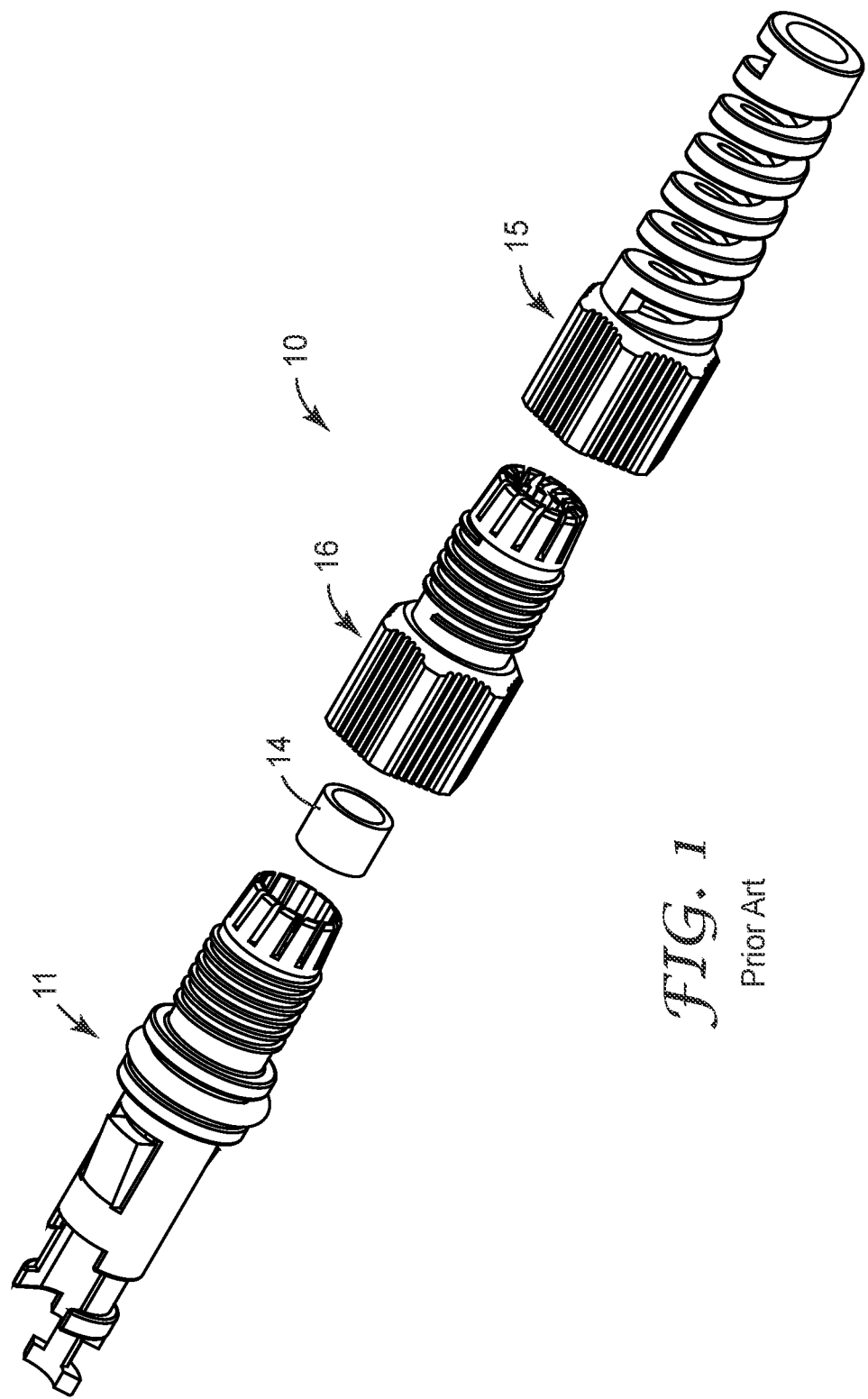
FIG. 1 is an exploded view of a conventional inlet device for the port of a telecommunication enclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

The exemplary cable sealing device described here in has a single unibody design to reduce cost and simplify installation of telecommunication cables into watertight telecommunication enclosures. Prior to cable installation, the cable sealing device serves as a port sealing plug that can be delivered with the enclosure until a cable needs to be installed into the port. Making a minor field modification to the cable sealing device and a cable tie transforms the sealing device from a simple sealing plug to a cable sealing device. The only waste created from the cable installation process is a small tear away portion removed from an end of the cable sealing device.

Some embodiments of the invention may include additional cable strain relief features such as cable anchors, strength member retention devices, friction enhancement features or a combination thereof.

Figure 2A:
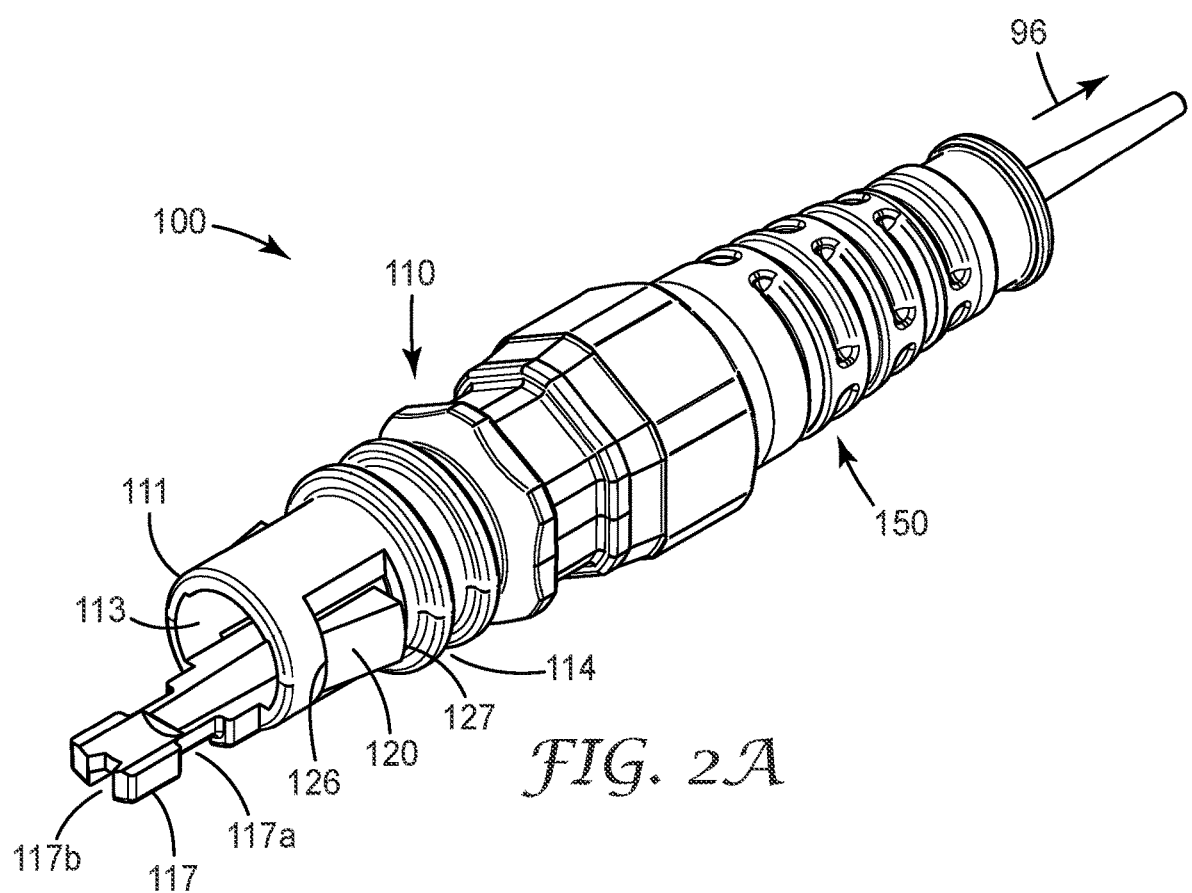
FIGS. 2A-2C are three views of a first embodiment of an exemplary cable sealing device according to an aspect of the present invention.
Figure 2B:
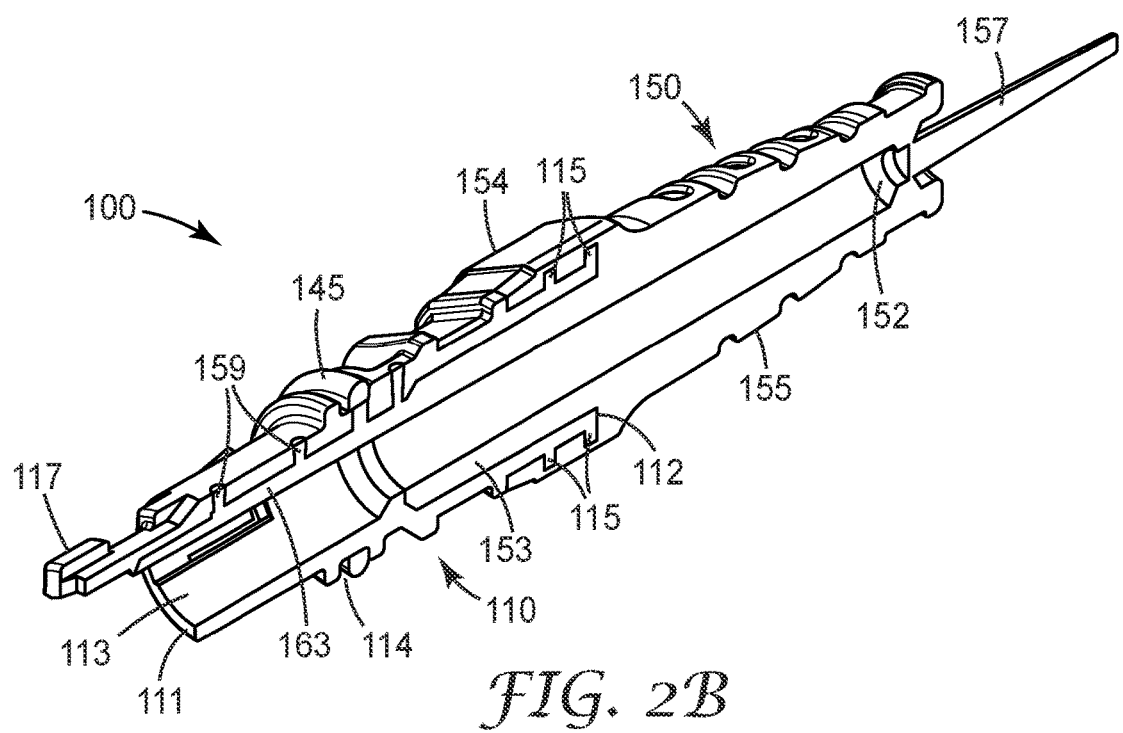
Figure 2C:
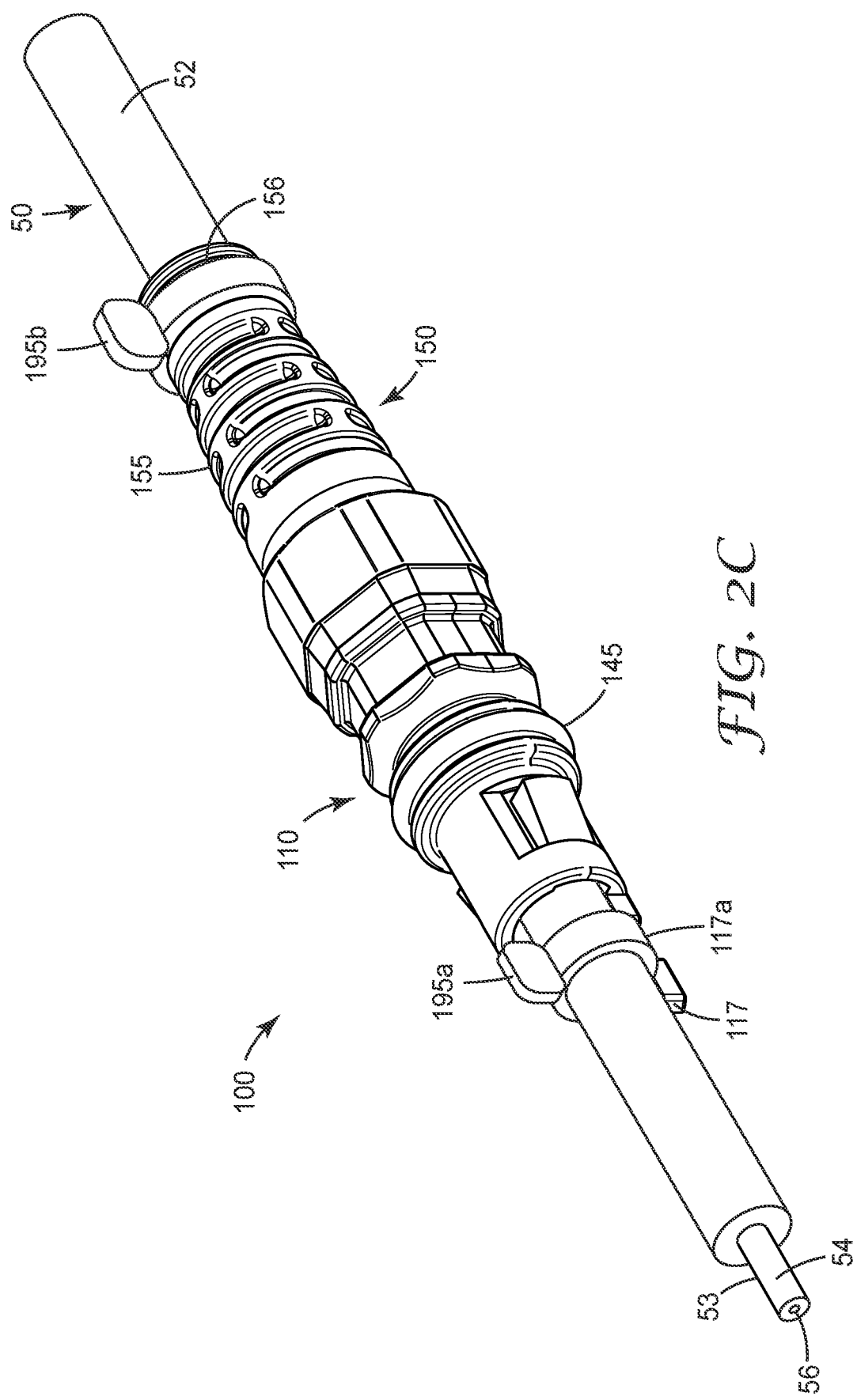

An example of an exemplary telecommunication cable useable with the cable sealing device of the present invention is a fiber optic cable such as cable 50 shown in FIG. 2C. The fiber optic cable typically includes a semi-rigid outer sheath 52 surrounding at least one optical fiber 53 and at least one strength member (not shown). The optical fibers may be enclosed in one or more loose buffer tubes or may be provided as one or more optical fiber ribbon cables. One to twelve optical fibers may reside in the loose buffer tube surrounded by a water-blocking gel or grease. Each of the ribbon cables may have from one to about twenty-four optical fibers. Each optical fiber has a polymeric coating that surrounds and protects the glass fiber. Examples of exemplary optical fiber cables include ResiLink ADF™ All-Dielectric Flat Drop Cable available from Pirelli Cables and Systems (Columbia, N.C.) or EZ DROP cable from Draka (Claremont, N.C.), and Mini DP Flat Drop Cable available from OFS (Northcross, Ga.). The optical fiber 53 has a polymeric coating 54 that surrounds and protects the glass fiber 56. The strength members may be either semi-rigid rods or a collection of loose fibers e.g. made of aramid fibers.

The exemplary cable sealing devices can come in a variety of sizes with smaller cable sealing devices being configured for use with low fiber count fiber cables (e.g. 1-12 optical fibers) and larger cable sealing devices being configured for use with higher fiber count fiber cables (e.g. up to 144 optical fibers).

Alternatively, the telecommunication cable may be a low wire count copper cable having a semi-rigid sheath surrounding a plurality of paired copper wires or a copper coax cable.

FIGS. 2A-2B show an exemplary cable sealing device 100 that can be used to environmentally seal the port of an optical fiber splice enclosure or bulkhead before and after a service connection is made. The cable sealing device has a unibody construction that comprises a rigid body portion 110 and an elastomeric body portion 150 that has been overmolded onto and extends from an end of the rigid body portion.

Rigid body portion 110 may be generally cylindrical and tubular in shape and includes an interior passageway 113 that extends along the length of the rigid body portion from a first end 111 to a second end 112 (shown in FIGS. 2B and 3A-3B) of the rigid body portion. The interior passageway may be configured to accommodate certain categories of telecommunication cables, such as cable 50 shown in FIG. 2C, including single fiber drop cables, multi-fiber cables, copper communication cables or coax cables. In an alternative embodiment, the rigid body portion can have an elliptical cross-section.

A cable retention device 117 may be located adjacent to the first end 111 of rigid body portion 110. In one exemplary embodiment shown in FIGS. 2A and 3A-3B, the cable retention device 117 may be integrally formed with the rigid body portion 110. In one aspect, the cable retention device can be T-shaped. A cable tie 195a can be secured around the narrow portion 117a of the cable retention device and a jacketed portion of the optical fiber cable passing through cable sealing device 100 to strain relieve the cable and secure in to the cable sealing device. Alternatively, the aramid strength members present in some optical fiber cables may be used to secure a fiber optic cable to the cable retention device by wrapping a length of the aramid strength members around the narrow portion of the cable retention device and tying them off.

Figure 3A:
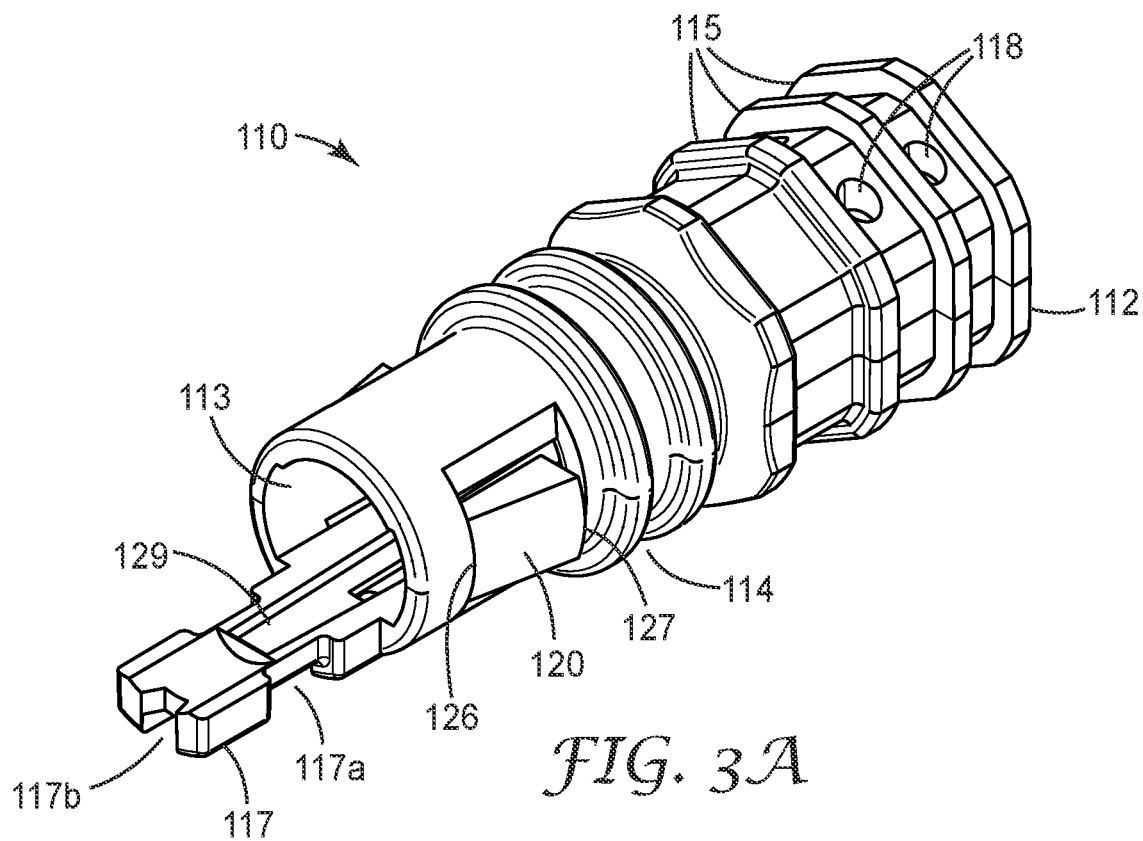
FIGS. 3A and 3B are two detail views of a rigid body portion of the cable sealing device of FIGS. 2A-2C.
Figure 3B:
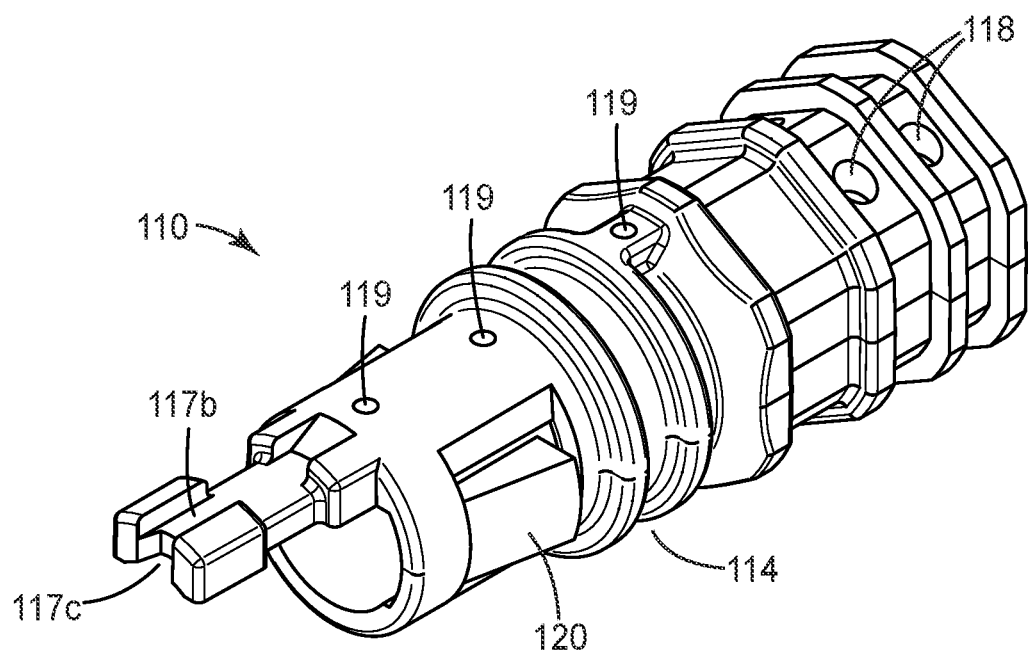

A channel 117b formed in the backside of the cable retention device 117 and extending to the free end of the cable retention device forming a notch 117c shown in FIGS. 3A and 2B. The notch and channel are configured to manage and capture flexible strength members (e.g. aramid or glass floss, yarn or string) of the cable passing through the exemplary cable sealing device. The flexible strength members are wrapped over the free end of the cable retention device through notch 117c and laid in channel 117b. They can be secured to the cable retention device by a cable tie or other securing or clamping device.

In an alternative aspect, the cable retention device may include a retention clip, a lug, or a crimp ring (not shown). The retention clip can retain the cable 50 in the cable retention device, for example by an interference fit. In some instances, retention clip or lug can be designed to secure rigid strength members to the cable sealing device, such as is described in U.S. Pat. No. 8,270,799 which is incorporated by reference herein, in its entirety.

In an alternative embodiment, an alternative cable retention device may be a separate part which may be secured to the first end 111 of the rigid body portion 110. An exemplary embodiment of such a cable retention device of this type is described in U.S. Pat. No. 6,487,344, which is incorporated by reference herein, in its entirety.

The rigid body portion 110 can have at least one connection features 120 disposed near to the first end 111 of the rigid body portion. In the exemplary embodiment shown in FIG. 2A, the cable sealing device comprises a pair of connection features in the form of cantilevered arms disposed on opposite sides of rigid body portion. The cantilevered arms are deformable cantilever and can flex when depressed. As shown in FIG. 2B, the cantilevered arms include a free end 127 and an attached end 126 that is connected to the rigid body portion 110 and acts as a living hinge for the cantilevered arms. In an exemplary embodiment, the free end 127 of the cantilevered arms may be depressed by applying an inward radial force. When depressed, the free end 127 of the cantilevered arms can move into a gap between the telecommunications cable 50 and the surface of the interior passageway 113, such that the cantilevered arms do not protrude beyond the external surface of the rigid body portion of the cable sealing device. In this state, the cable sealing device may be inserted into or removed from a close-fitting port of a telecommunication enclosure. After insertion through the port of the telecommunication enclosure, the cantilevered arms can spring outward to their original position shown in FIG. 2A to lock the cable sealing device in the close-fitting port. Similarly, the cable sealing device may be removed from the close-fitting port when the cantilevered arms are sufficiently depressed and pulling the cable sealing device away from the port.

The cantilevered arms may be created by cutting the cantilevered arms free of the rigid body portion 110 on three sides or by a molding process when the rigid body portion is formed (e.g. by an injection molding). In an alternative embodiment, the cantilevered arms may be spring loaded and/or have a hinge pin connecting the locking element to the rigid body portion of the cable sealing device. Alternatively, more than two cantilevered arms may be used. Preferably, the cantilevered arms are spaced evenly around the circumference of the rigid body portion. In yet another embodiment, the securing zone may include a receiving channel into which a forked locking device may be inserted to secure the cable sealing device into a port of a telecommunication enclosure.

A groove 114 may be located between the connection features 120 and the second end 112 of rigid body portion 110 to receive an external sealing member 145 such as an o-ring (FIG. 2C). This external sealing member can provide an environmental seal between the cable sealing device and a port of a telecommunication enclosure when the cable sealing device is fully seated therein. Alternatively, an elastomeric external sealing member can be formed in the groove when the elastomeric body portion is formed on the second end of the rigid body portion, such that the external sealing member is an integral part of the cable sealing device as illustrated in FIGS. 6A-6C and 7A-7C.

Figure 4A:
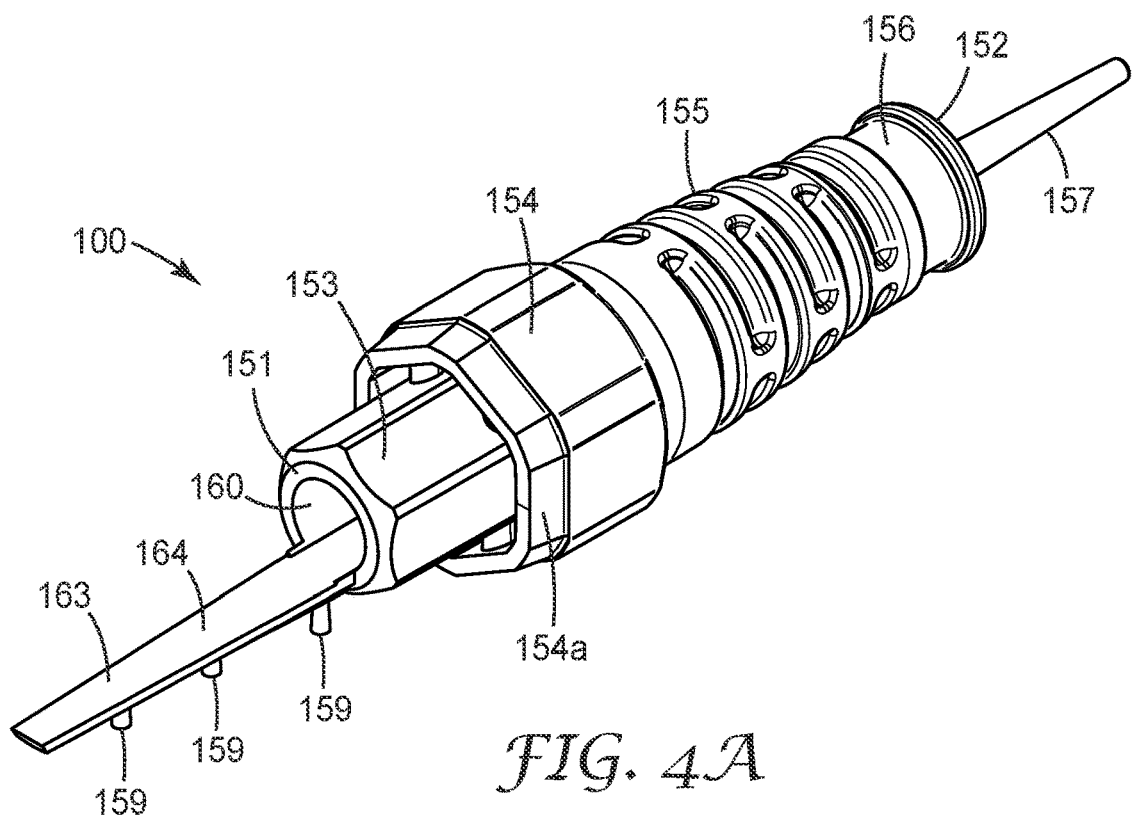
FIGS. 4A and 4B are two detail views of am elastomeric body portion of the cable sealing device of FIGS. 2A-2C.
Figure 4B:
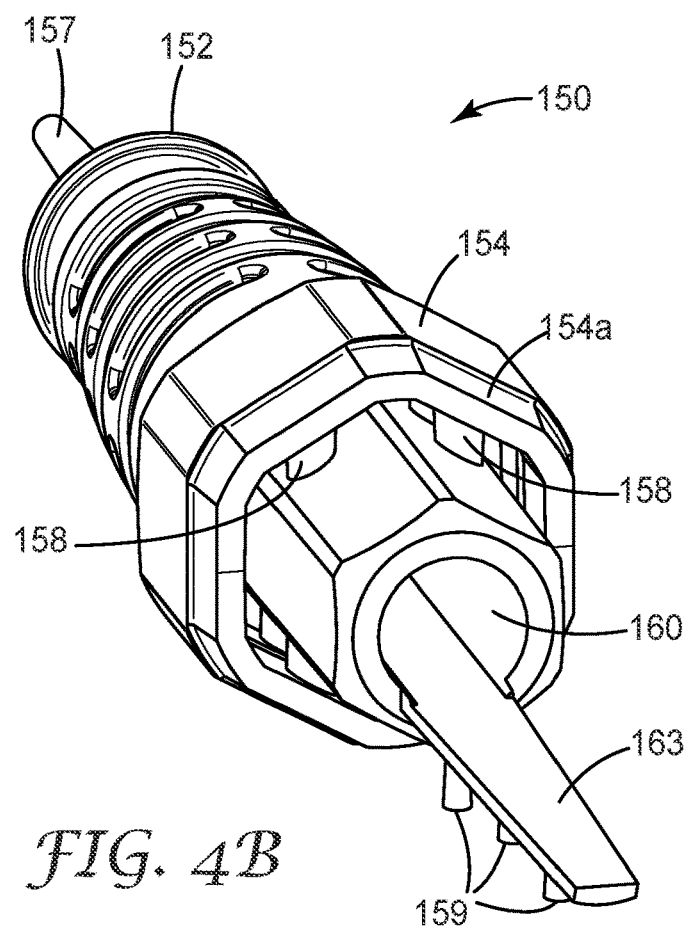
Figure 5A:
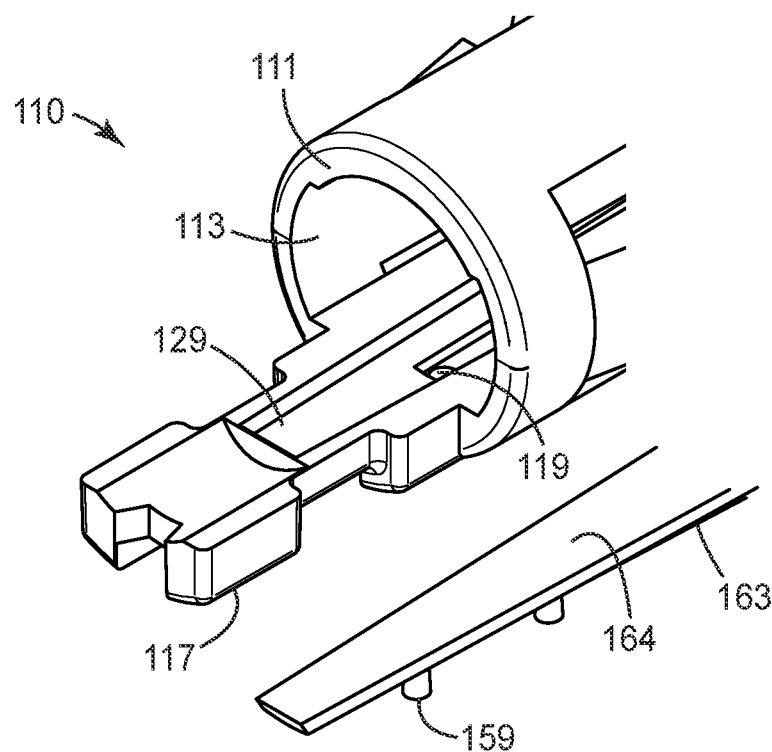
FIGS. 5A and 5B are two detail views showing a friction element disposed at a first end of the cable sealing device of FIGS. 2A-2C.
Figure 5B:
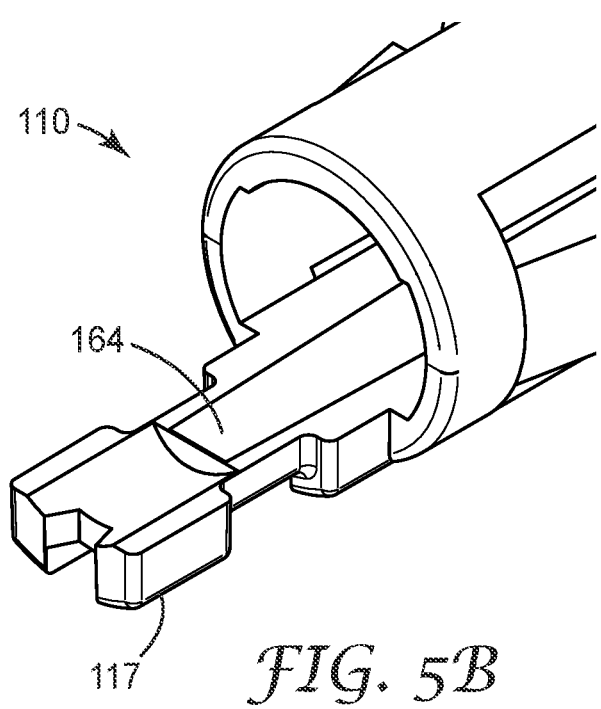

Elastomeric body portion 150 is an integral part of the unibody structure of cable sealing device 100 as shown in FIGS. 2A-2B. FIGS. 4A and 4B are detail views of the elastomeric body portion separated from the rigid body portion so that the integral features of the elastomeric body portion can be fully appreciated. Elastomeric body portion 150 has a front end 151 that includes an interior sleeve 153 that extends into interior passageway 113 at the second end 112 of rigid body portion and an exterior sealing sleeve 154 that is formed over the second end of rigid body portion 110 and configured to provide an environmental seal with a port in a telecommunication enclosure, terminal or bulkhead in which it is installed.

For example, the external dimensions of the open end are formed so that it engages with the port structure 520 (FIG. 10A) to prevent ingress of dust and moisture into the optical fiber terminal, enclosure or through a bulkhead prior to installation of a cable through the cable sealing device. In an exemplary aspect, the exterior sealing sleeve can include an inclined sealing face 154a disposed near the open or front end of the exterior sealing sleeve. The inclined sealing face is configured to seal against the opening or port in a port structure of a fiber optic terminal, telecommunication enclosure or bulk head.

The elastomeric body portion is formed as a closed end tubular structure. A strain relief boot 155 extends away from the exterior sealing sleeve. Initially, the strain relief boot has a closed end 152 to block the tubular opening that extends through the elastomeric body portion until a cable needs to be inserted therethrough. A plurality of depressions can be formed in the exterior surface such that they extend only partially through the thickness of the of the strain relief boot enhancing the side pull capability of cable sealing device 100, while maintaining the sealing capability of the device.

The closed end 152 of the elastomeric body portion 150 includes a removable portion 157 When the removable portion is in place and cable sealing device 100 is disposed in a port of a telecommunication enclosure (FIG. 1C), terminal, or bulkhead, the cable sealing device serves as a dust cap or sealing plug for a port structure of an optical fiber terminal, to prevent ingress of dirt or moisture before a service connection is made.

When a cable needs to be installed, the installer removes the cable sealing device from port by depressing the cantilevered arms on the rigid body portion and pulling the cable sealing device from the port. The removable portion 157 is detached from the closed end of the elastomeric body portion 150 leaving an opening into the tubular opening that extends through the elastomeric body portion. A cable, such as cable 50 (FIG. 2C), can be inserted through the cable sealing device 100 and secured to cable retention device 117 at the first end 111 of the rigid body portion 110. A cable tie 195*b* can be secured around the end of the strain relief boot in a sealing furrow 156 to ensure that the elastomeric body portion seals around the cable. In some embodiments the exemplary cable sealing device provides a weatherproof rating of IP-68.

In some embodiments a pulling loop, tab or extension (no shown) may be formed on the outer surface of the elastomeric body portion to aid in removing the cable sealing device from the port in a telecommunication enclosure, terminal or bulk head.

In some embodiments, the elastomeric body portion may further comprise a tongue 163 of elastomeric material extending from the front end 151 of the elastomeric body portion (e.g. extending forward from the interior sleeve 153) and extending through the interior passageway 113 in the rigid body portion (FIGS. 2A-2B and 5A-5B). Rigid body portion 110 include a depression 129 extending through the interior passageway accommodate and hold elastomeric tongue 163. In an exemplary aspect, the depression may extent onto cable retention device 117 to accommodate and hold elastomeric tongue 163 in proximity to the tie down point where the cable is secured to the cable sealing device. The exposed surface of the elastomeric tongue provides an anti-slip or friction surface that improves the retention of a cable that is secured to the cable retention device.

Referring to FIGS. 2C, 3A-3B, 4A-4B and 5A and 5B, interlocking features 118, 119, 158, 159 are provided in the elastomeric body portion 150 and the rigid body portion 110 of the exemplary cable sealing devices described herein to ensure that the two body portions are not separable. For example, the rigid body portion can include one or more locking ridges 115 and/or locking holes or depressions 118, 119. When the elastomeric body portion is over molded in and around the body portion the elastomeric material fills in the area around and between the locking ridges and in the locking holes or depressions. The elastomeric material that extends into the locking holes or depressions form locking tabs 158, 159.

At least one of the exterior sealing sleeve and the second end of the rigid body portion includes a keying feature configured to engage with the port structure in to ensure proper alignment or provide an anti-rotation property to the cable sealing member when is disposed in the port structure. In an exemplary embodiment, the second end 111 of the rigid portion 110 and/or the exterior sealing sleeve 154 can have a hexagonally shaped cross-section or external profile to facilitate gripping of the cable securing device with a tool or by hand. The hexagonal cross-section may also provide a keying feature with an appropriately shaped port structure in an enclosure, terminal or bulkhead. These portions of the cable sealing device may have other geometric configurations such as a cylindrical shape, a rectangular shape or other polygonal shape.

Figure 6A:
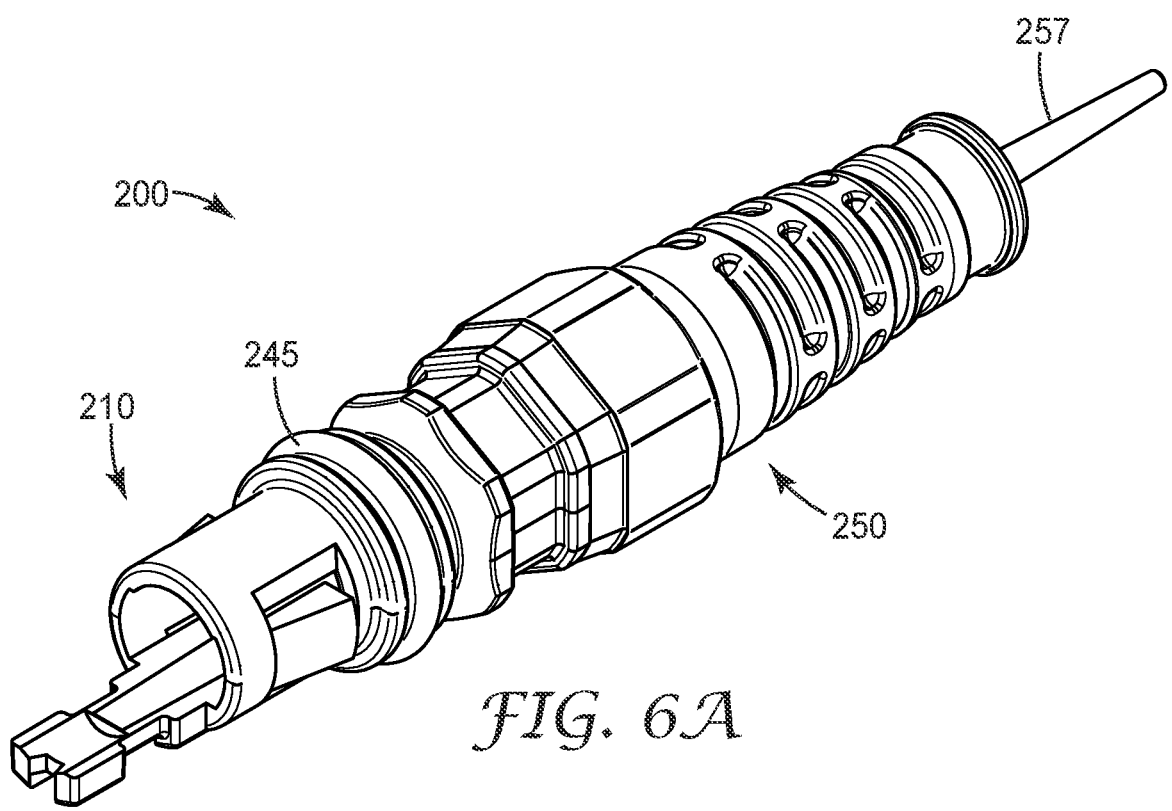
FIGS. 6A and 6B are two views of a second embodiment of an exemplary cable sealing device according to an aspect of the present invention.
Figure 6B:
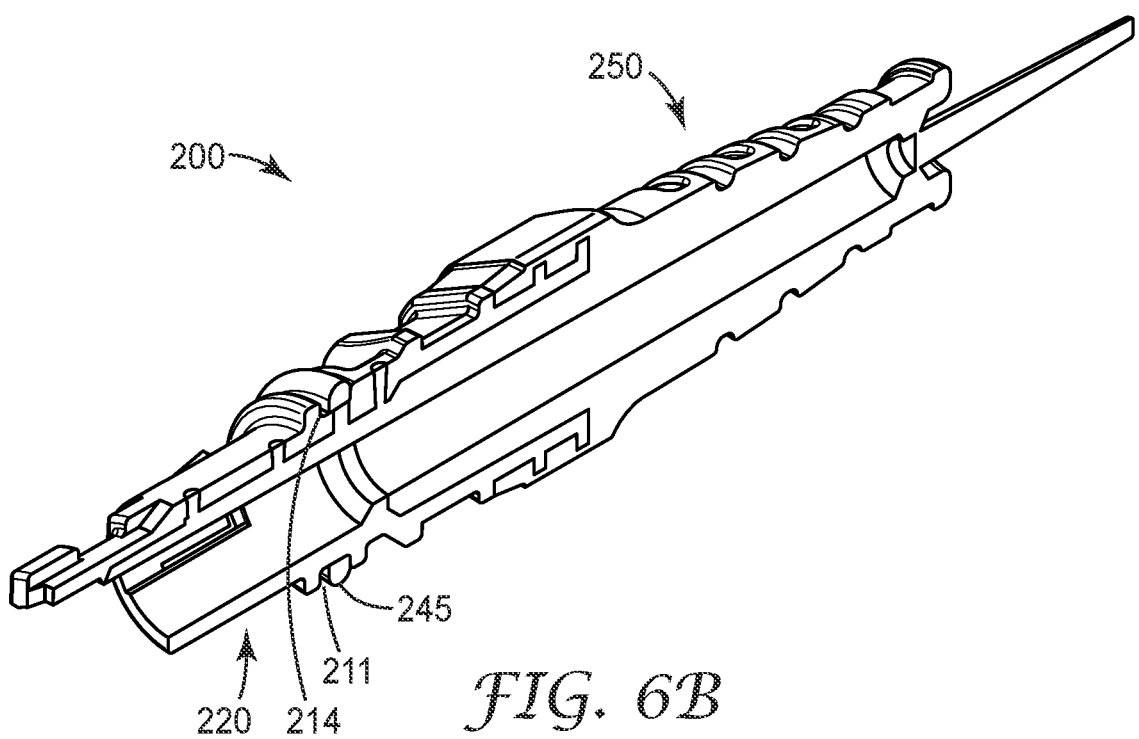
Figure 6C:
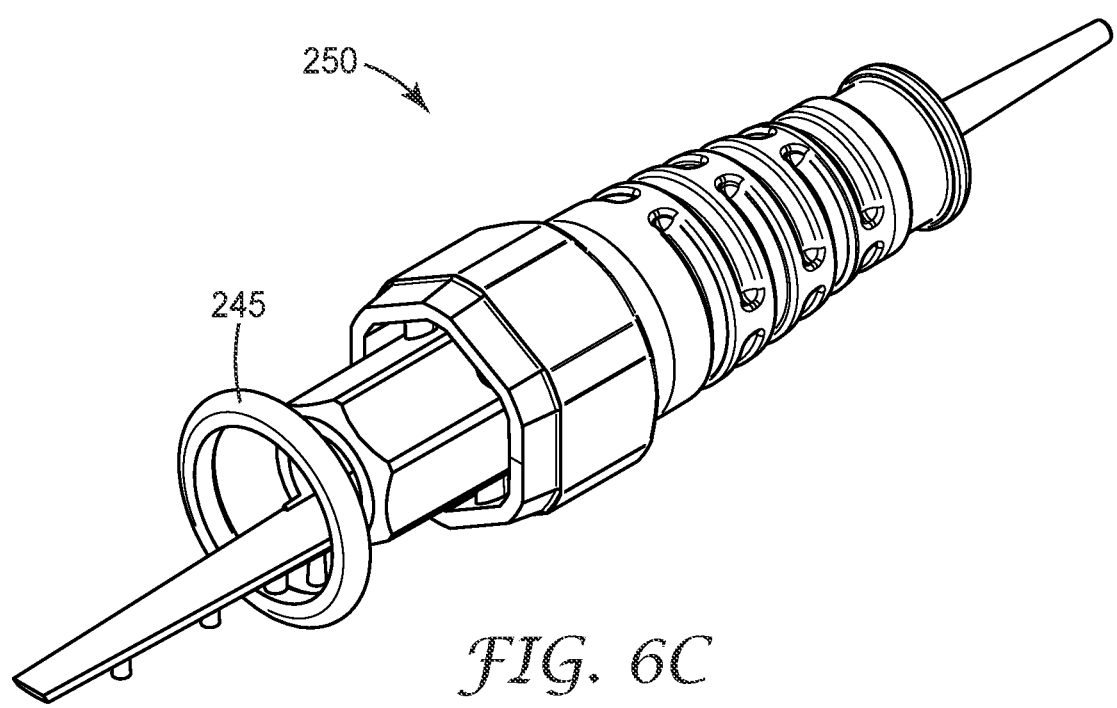
FIG. 6C is an isometric view of a elastomeric body portion of the cable sealing device of FIGS. 6A and 6B.

FIGS. 6A-6C illustrate aspects of a second exemplary embodiment of a cable sealing device 200 of the present invention. In particular, FIGS. 6A and 6B show cable sealing device 200 which includes an integrally formed external sealing member 245 that is formed in groove in the rigid body portion 210, similar to groove 114 in the rigid body portion 110 shown in FIG. 3A, at the same time that the elastomeric body portion 250 is formed. FIG. 6C shows the elastomeric body portion 250 and the external sealing member 245 without rigid body portion of the cable sealing device.

Cable sealing device 200 is substantially similar to cable sealing device 100 described previously with the exception that the external sealing member 245 is now an integral part cable sealing device 200. External sealing member 245 has a loaf shaped cross-section as seen in FIG. 6B having a generally rectangular shaped lower portion defined by the dimensions and shape of grove 214 in which the external sealing member is formed and a domed top portion that is configured to seal with an interior portion of a port structure in a telecommunication enclosure, terminal or bulkhead.

The exemplary external sealing member can have other cross-sectional shapes limited only to the sealing capability of the resulting sealing device and the molding capability used to manufacture the exemplary cable sealing device.

Figure 7A:
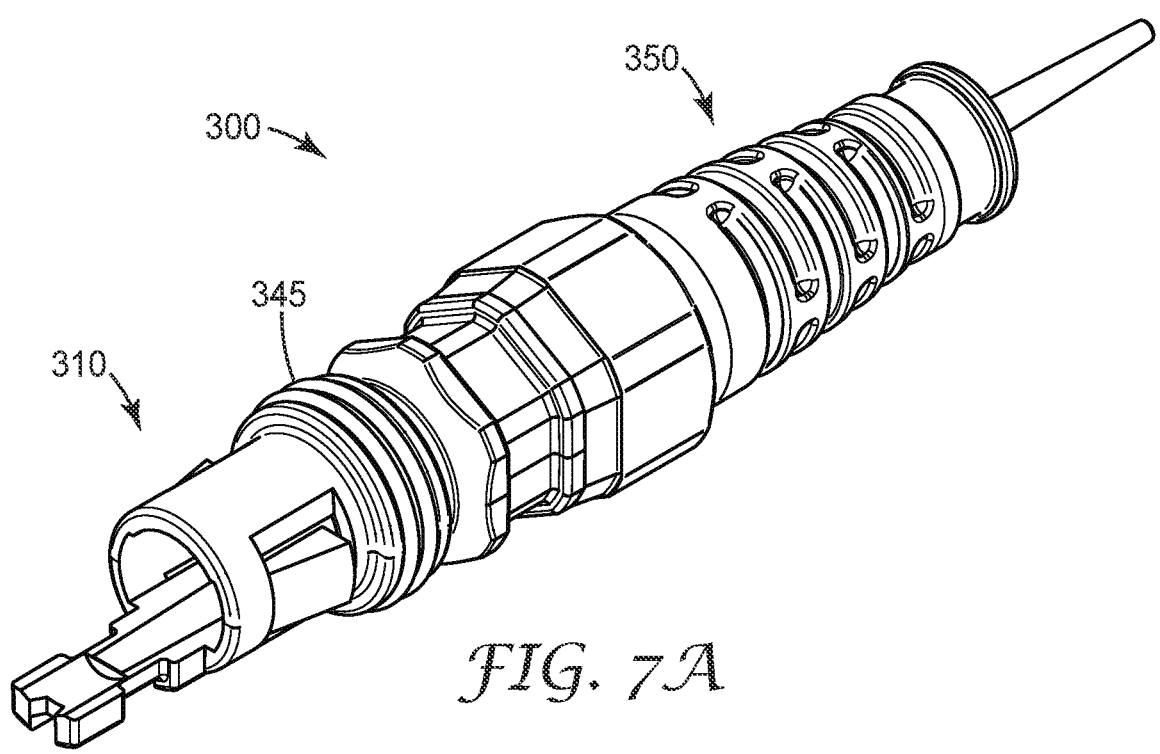
FIGS. 7A and 7B are two views of a third embodiment of an exemplary cable sealing device according to an aspect of the present invention.
Figure 7B:
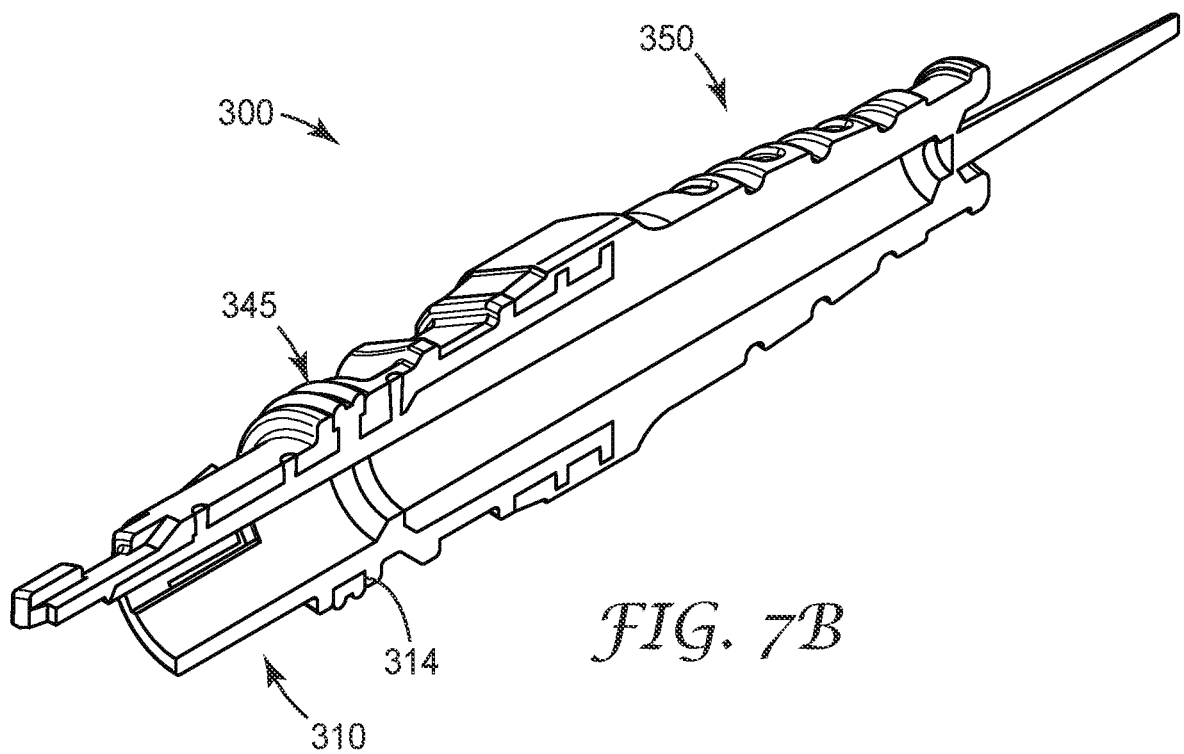
Figure 7C:
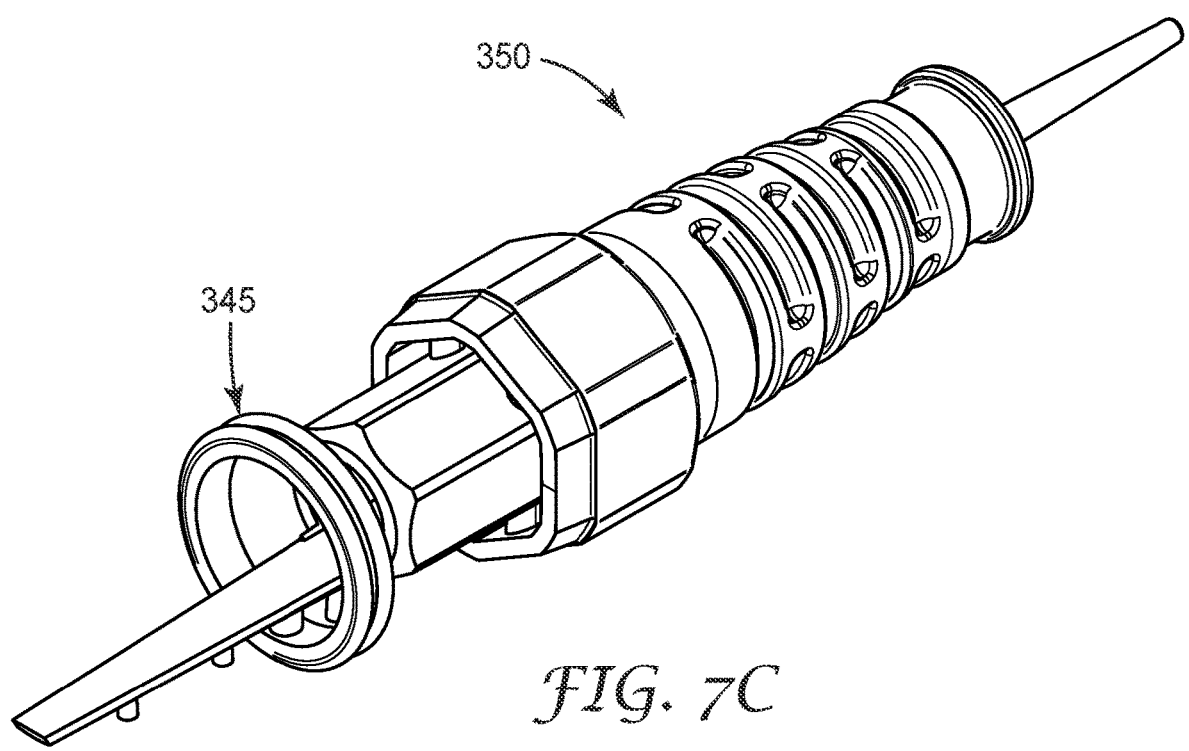
FIG. 7C is an isometric view of a elastomeric body portion of the cable sealing device of FIGS. 7A and 7B.

For example, FIGS. 7A-7C illustrate aspects of a third exemplary embodiment of a cable sealing device 300 of the present invention. In particular, FIGS. 7A and 7B show cable sealing device 300 which includes an integrally formed external sealing member 345 having a camel-back-shaped external sealing member that is formed in groove 314 in the rigid body portion 310. FIG. 7C shows the elastomeric body portion 350 and the external sealing member 345 without rigid body portion of the cable sealing device.

Cable sealing device 300 is substantially similar to cable sealing device 100 described previously with the exception that the external sealing member 345 is now an integral part cable sealing device 300 that has a camel-back-shaped cross-section as seen in FIG. 7B. The cross-section of external sealing member 345 has a generally rectangular shaped lower portion defined by the dimensions and shape of grove 314 in which the external sealing member is formed and a top portion having two domed portions separated by a valley. External sealing member 345 is configured to seal with an interior portion of a port structure in a telecommunication enclosure, terminal or bulkhead.

Figure 8A:
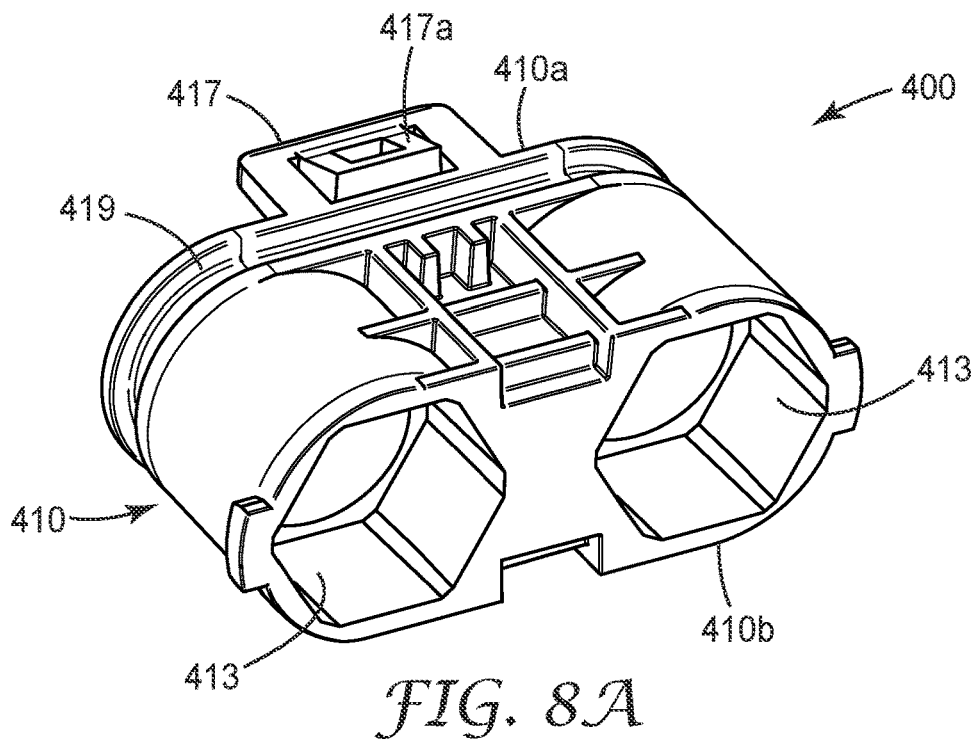
FIGS. 8A and 8B are two views of an oval port adapter.
Figure 8B:
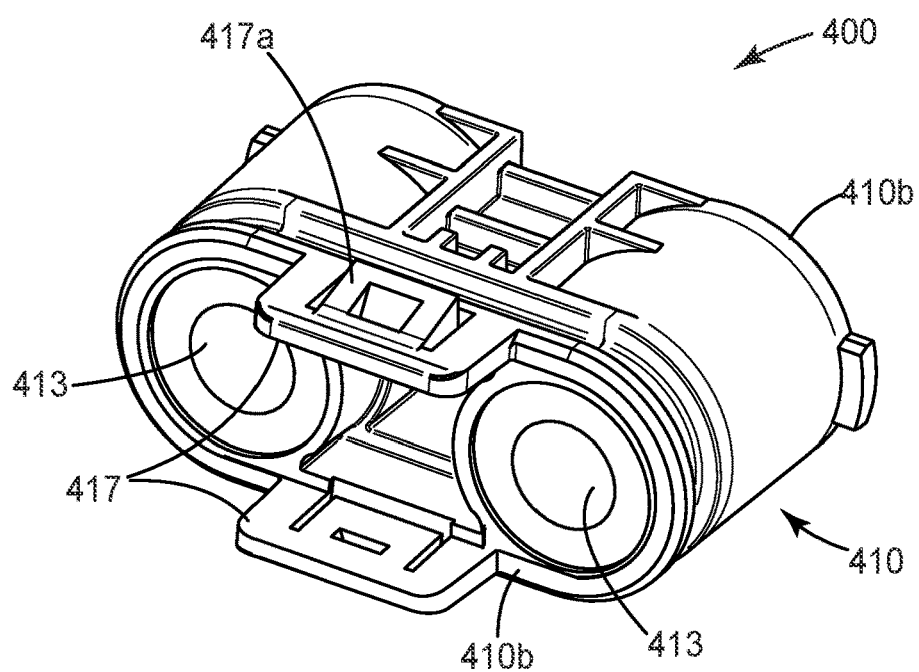

FIGS. 8A and 8B show an oval port adapter 400 configured to modify an oval port structure in a telecommunication enclosure to accept a pair of cable sealing devices 100, 200, 300 of the present invention. In other embodiments, the oval port adapter can be configured to accept an alternative number of the exemplary cable sealing devices depending on the size of the oval port into which it will be installed and the size (cross section) of the cable sealing devices to be installed therein.

Oval port adapter 400 includes a housing 410 having a first end 410*a* and a second end 410*b*, which can be formed of plastic by conventional methods, for example by injection molding.

Housing 410 has an elliptical cross section that includes two parallel cable channels 413 extending through housing from the first end 410*a* to the second end 410*b*. The cable channels gave a hexagonal cross-section at a second end of the housing to accept at least a portion of the hexagonal external profile of the exemplary cable sealing devices 100, 200, 300 described herein.

Housing 410 includes a pair of resilient arms 417 located on opposing sides of the housing near the first end 410*a* of the housing. At the end of each of the arms 417 can be a latch structure 417*a*. The latch structure engages with the edge of an oval port in a telecommunication enclosure to securely retain the oval port adapter 400 when fully inserted. When the oval port adapter is inserted into the port of a telecommunication enclosure, proper positioning can be confirmed by an auditable click as the latch structures 417*a* engage with the edges of port. To remove the oval port adapter 400, the latch structures 417a may be pressed inward toward the centerline of the housing 410 until the oval port adapter slips out of the port.

A groove 419 (FIG. 8A) is formed in an outer surface of housing 410 between the first and second ends 410a, 410b of housing 410 to receive an external sealing member 445 (FIG. 9) such as an o-ring. This external sealing member 445 can provide an environmental seal between the oval port adapter 400 and a port of a telecommunication enclosure when the oval port adapter is fully seated therein.

Figure 9:
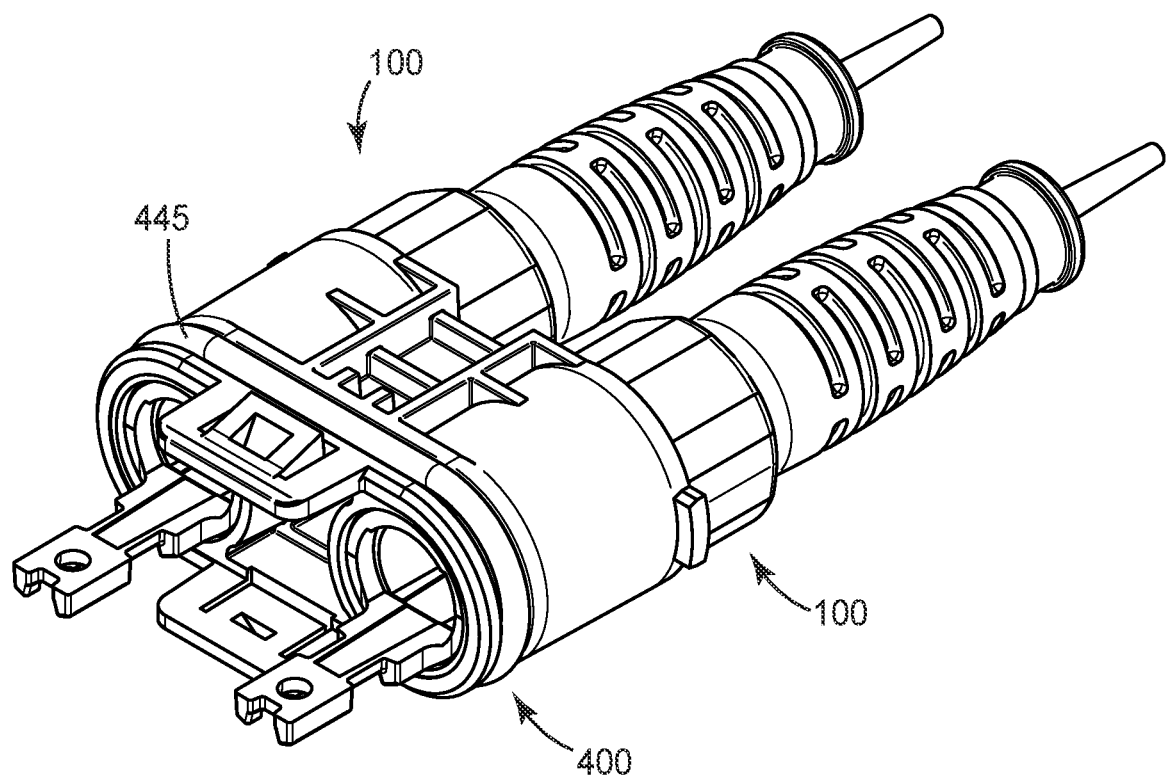
FIG. 9 is an isometric view of two exemplary cabling devices of the present invention installed in the oval port adapter of FIGS. 8A-8B.

FIG. 9 shows a pair of cable sealing devices 100 installed in the cable channels of oval port adapter 200.

The rigid portion of the body can be an injection molded part from a resin material. In an exemplary aspect, the resin material can be selected from glass filled polypropylene, a glass filled polyaramide or an engineering resin.

The resilient body material can be overmolded around at least a portion of the rigid body portion by a compression molding process or by a two-step injection molding process. The resilient material should also have sufficient elasticity to form an environmental seal around the drop cable and manage the bend radius of the fiber drop cable after connection to the fiber terminal, as well as being resistant to ultraviolet radiation and chemical products. The exemplary resilient material can be selected from an acrylonitrile butadiene rubber, silicone rubber, ethylene propylene diene monomer rubber or a thermoplastic elastomers such as are available under the tradename ELASTOLLAN from BASF (Florham Park, N.J.). In an exemplary aspect, the exemplary resilient material for the body of the sealing device will have a Shore A hardness between about 30 and about 50.

Figure 10A:
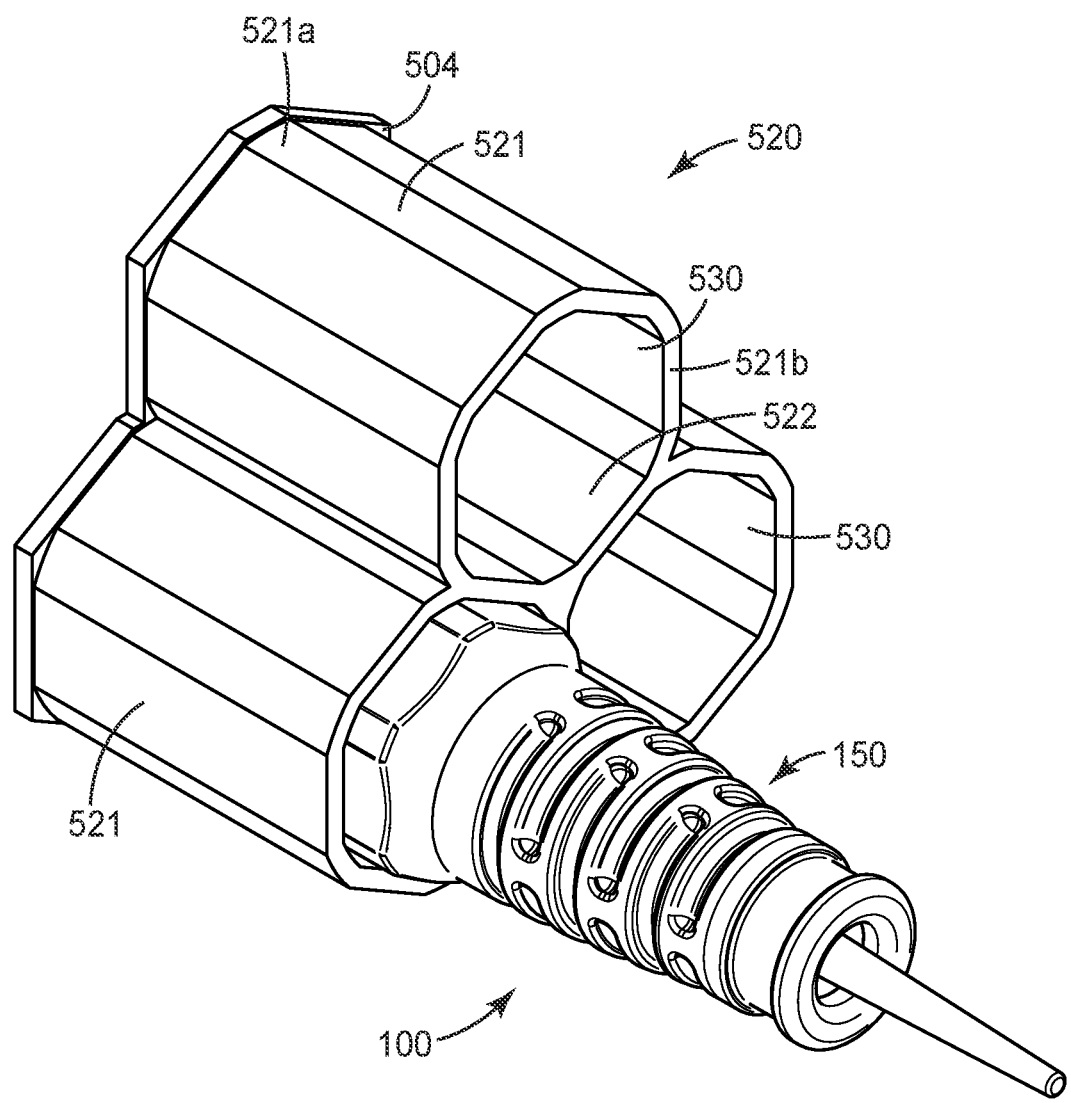
FIG. 10A is a detail view of an exemplary port structure suitable for the installation of two exemplary cabling devices of the present invention.
Figure 10B:
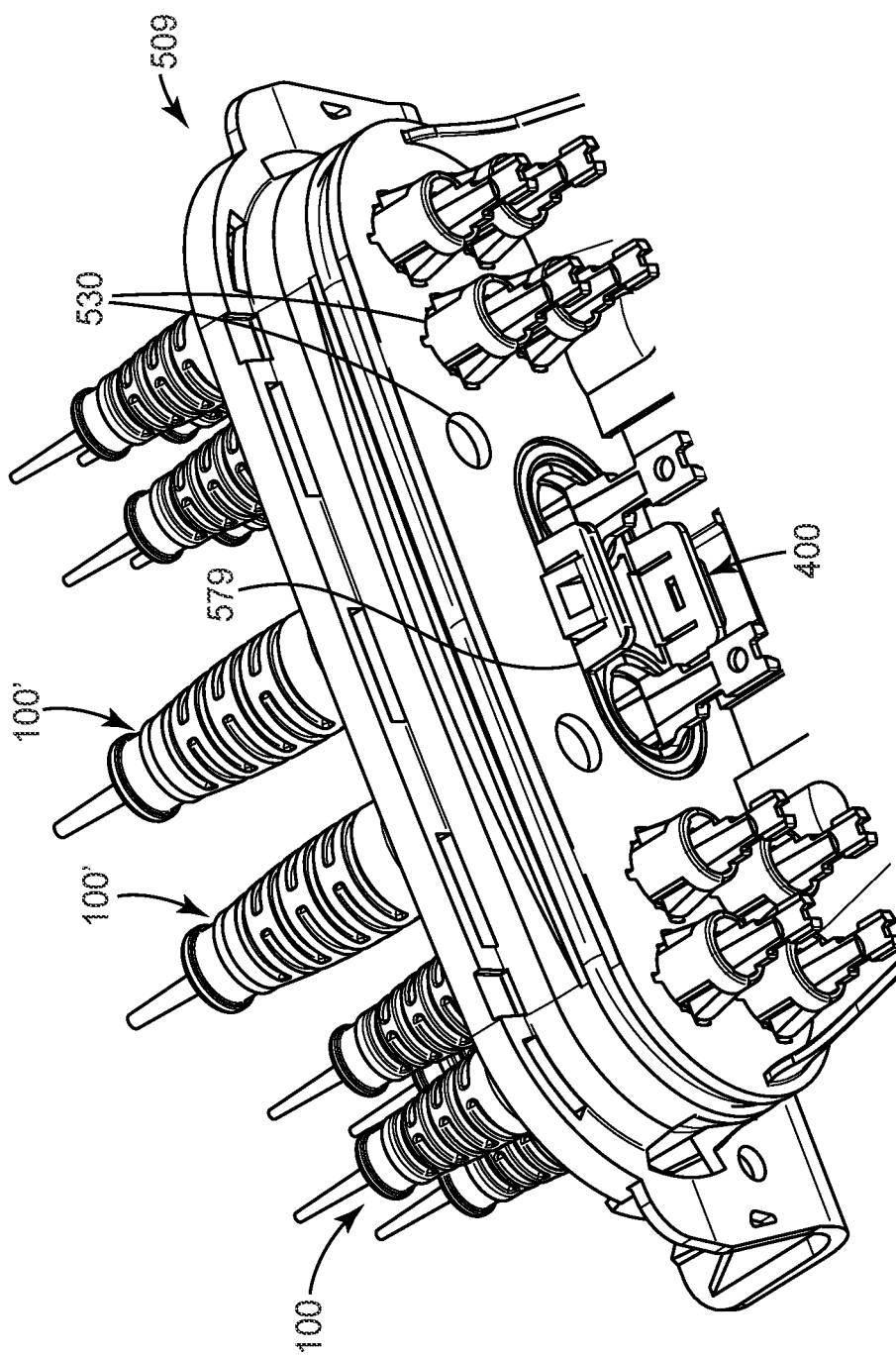
FIGS. 10B and 10C are two views of an exemplary enclosure base with a plurality of installed exemplary cabling devices of the present invention.
Figure 10C:
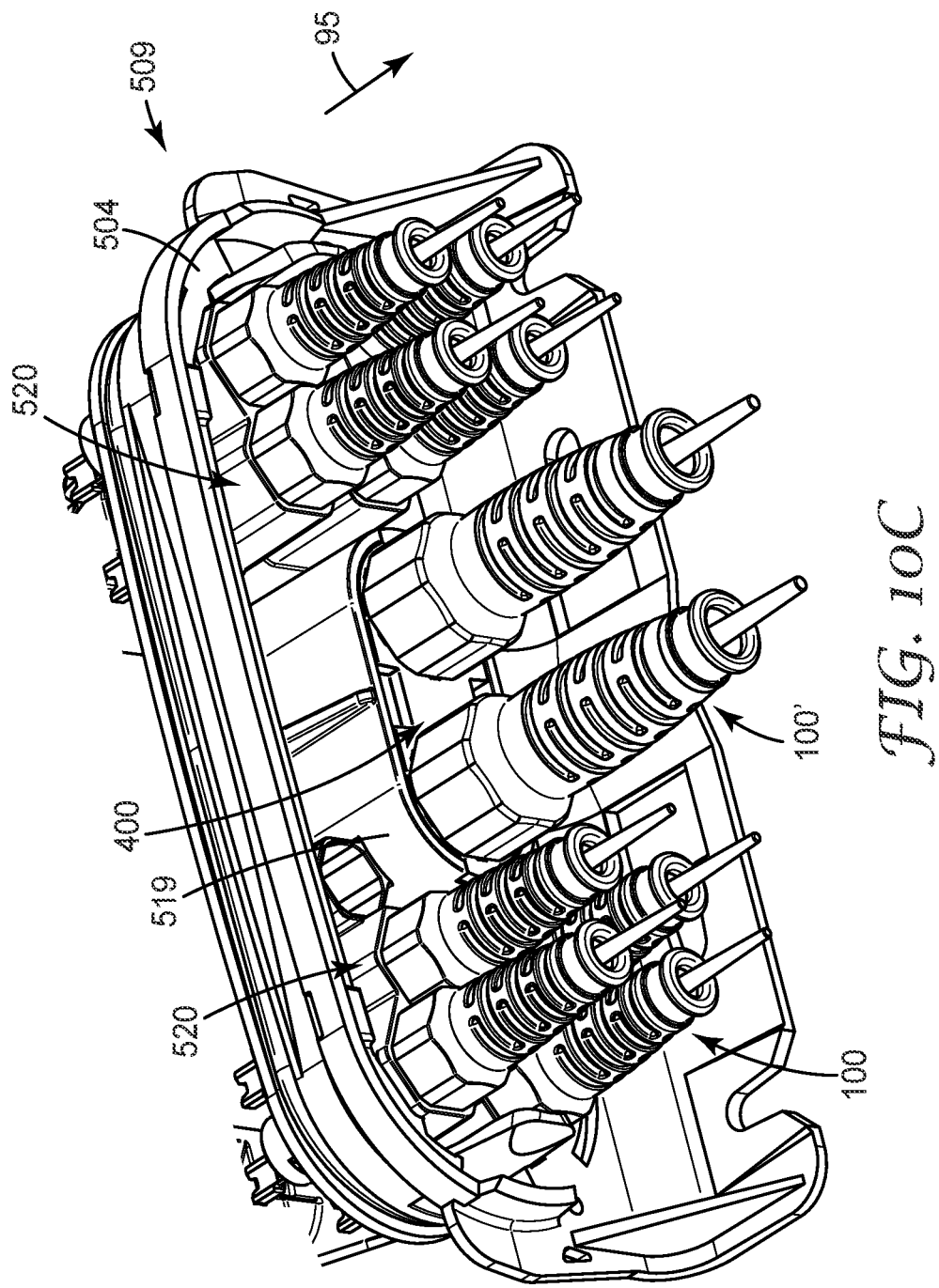
Figure 10D:
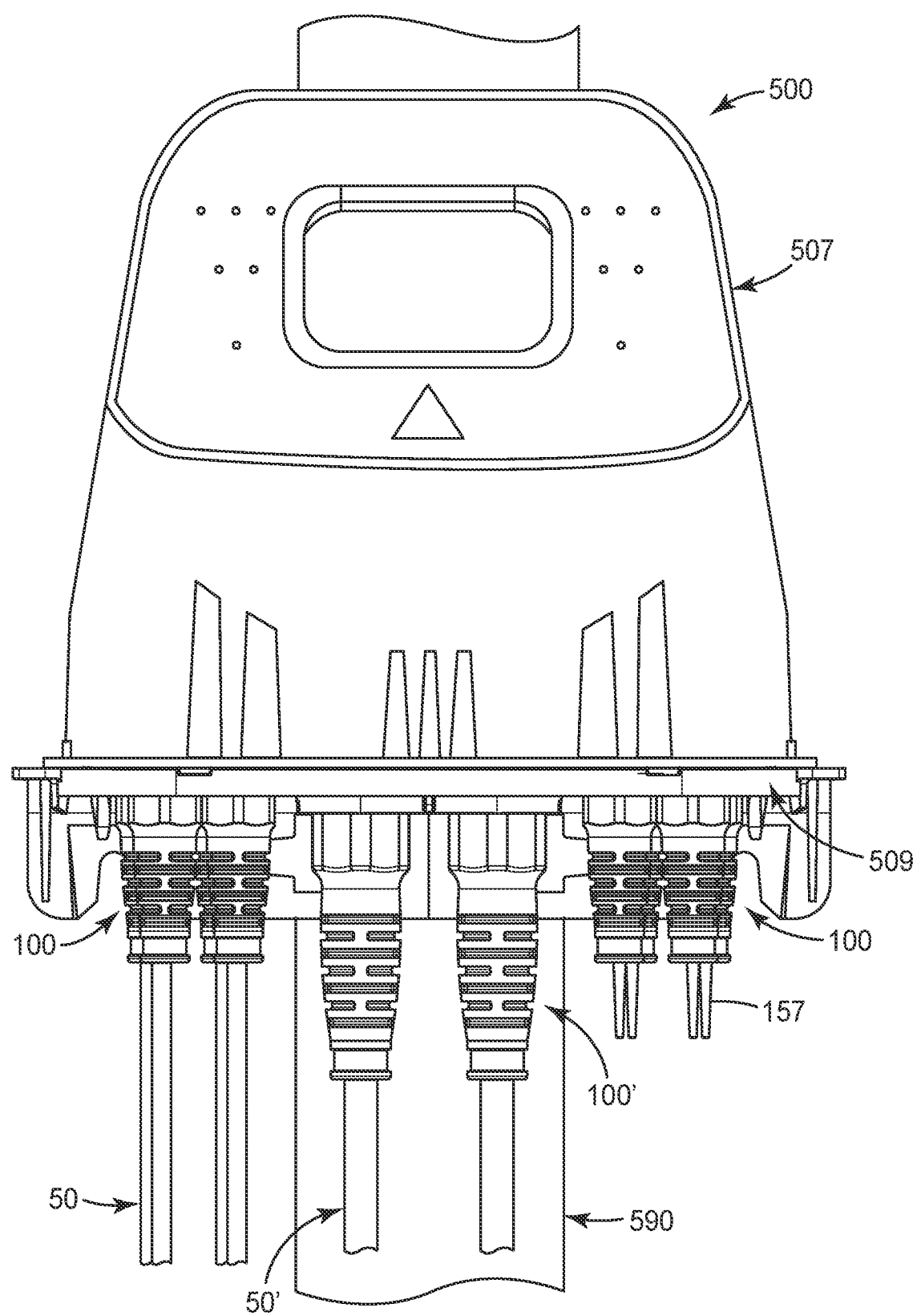
FIG. 10D shows the exemplary cable sealing devices of the present invention mounted in an aerial terminal that is attached to a telephone pole.

Referring to FIGS. 10A-10D, cable sealing devices 100, 200, 300 are configured to seal ports of a telecommunication enclosure, terminal or bulkhead to prevent ingress of environmental contaminants (e.g. moisture, dust, bugs, etc.) into the protected interior of the enclosure, terminal or bulkhead. FIG. 10A shows a portion pf a port structure 520 into which the exemplary cabling devices 100 of the present invention can be installed. FIGS. 10B and 10C show an enclosure base 509 having the exemplary port structure 520 that has a plurality of installed exemplary cabling devices of the present invention. FIG. 10D shows the exemplary cable sealing devices 100 of the present invention mounted in an aerial terminal 500 that is attached to a telephone pole 590.

Aerial terminal 500 includes a base 509 and a cover 507 (FIG. 10D) that is removably securable to the base. An exemplary fiber terminal is described in commonly owned US Pat. Publication No. 2015/0253528, incorporated herein by reference in its entirety. The base 509 includes port structure 520 having at least one port for receiving exemplary the cabling devices of the present invention (e.g. cable sealing device 100). The base may have one, two, or any other number port structures 520 as needed for a particular application. Base 509 of the fiber terminal includes two clusters of hexagonal close packed port structures 520 disposed on either side of an oval port structure 519 allowing for a higher density of ports in a smaller amount of space, thus increasing the capacity of enclosure 500. The cover 507 may be secured to the base 509 by a bail, clamps or other mechanical fastening method. When engaged, the base and cover provide protected space within the enclosure for the internal components such as splice trays, splitters/splitter modules, fan-out devices, etc. from the weather, insects and other external hazards.

The base of aerial terminal 500 includes a wall section 504 having a plurality of port structures 520 for receiving a fiber optic connector adapter therein. For example, FIG. 10A shows a portion the base 509 of the aerial terminal that a two-dimensional, conjoined port structure. In a first aspect, the port structure has an integral sleeve section 521 disposed around the port opening 530 outside of the fiber terminal 500. Sleeve section 521 has a first end 521a at the wall portion 504 of the port structure 320 and a second end 521b disposed at the end opposite the first end. The sleeve section is tubular having a channel 522 extending from the second end to the first end and through the wall portion 504. The point at which the channel passes through the wall portion is defined as the port opening or port 530. The exemplary sleeve section of port structure can be generally hexagonal port structure (i.e. honeycomb shaped) extending from an end wall of the enclosure. The sleeve section of the port structure can have an external shape of a hexagonal prism, although geometric configurations such as a cylinder, a rectangular prism or other polygonal prism. The exterior of the rigid portion 110 and/or the exterior sealing sleeve 154 of cable sealing device 100 (FIG. 2A) is configures to have the same profile as channel 522.

In an alternative aspect, the sleeve portion can extend into the body of the enclosure, while in yet another aspect a portion of the sleeve portion around the port can extend from an exterior wall of the enclosure and a portion can extend from an interior wall of the enclosure into the body of the enclosure.

Aerial fiber terminal 500 has a plurality of port 530 (FIG. 10B) disposed within a port structure 520, and exemplary multi-purpose sealing devices 100 removably disposed in each of the plurality of ports when the terminal is added to the network. The elastomeric body portion 150 of the exemplary sealing device disposed on the outside of the terminal (FIGS. 10C and 10D). The elastomeric body portion has a body having an open end molded onto the second end of the rigid body portion and a closed end 152, wherein the closed end includes a removable portion 157 defining a first state. In this configuration the exemplary cable sealing device 100 provides an environmental barrier or seal to the port in which it is installed. Thus, in the first state, the exemplary sealing device can be thought of as a dust cap or dust plug for the port.

When a customer requests service, a craftsman extracts cable sealing device 100 from the port by gripping in the cable sealing devise exerting an extraction force away from the fiber terminal as illustrated by directional arrow 95 as shown in FIG. 10C.

To make the service connection, the craftsman can grip the cable sealing device 100 in one hand and the removable portion 157 of the sealing device in the other hand or with a tool such as a pair of pliers. Pulling the removable portion away from the sealing device body as shown in FIG. 2A by directional arrow 96 separates the removable portion from the body of the sealing device leaving an insertion opening (not shown). A terminal end of a cable 50 is inserted the insertion opening. The resilient material of the exemplary sealing device can be stretched to accommodate the cable passing therethrough.

Once a sufficient amount of cable 50 has been passed through the insertion opening a cable tie 195b is secured around the end of the strain relief boot 155 in a sealing furrow 156 to ensure that the elastomeric body portion seals around the cable as shown in FIG. 2C. Next, cable tie 195A or other retention means can be used to secure the optical fiber cable (i.e. jacket or strength member(s) to cable retention device 117 to strain relieve the cable.

The terminal end of the cable can then be prepared as needed for splicing within the aerial terminal or to apply a field mountable connector which is interconnected within the aerial terminal.

The cable sealing device 100 is reinserted into the port into the aerial terminal the second state of the exemplary cable sealing device. In the second state, the exemplary cable sealing device creates an environmental seal between the device and the port of the terminal and the optical fiber drop cable and the device. In some aspects, the exemplary sealing device can also help in maintaining the minimum bend radius of the fiber drop cable as it exits the terminal port structure. In still other embodiments, the exemplary sealing device can also be used to strain relieve the optical fiber drop cable.

The terminal end of the cable can be prepared according to known processes and methods for field splicing of the optical fibers or for mounting of field terminated optical fiber connectors. In one aspect, the signal connection comprises forming a splice connection. In another aspect, the signal connection comprises mounting a field installable connector on the terminal end of the cable and mating it with a mating connector within the fiber terminal. In a third aspect, the signal connection comprises mating the connector of a preterminated drop cable with a mating connector within the fiber terminal.

Advantageously, the exemplary cable sealing devices 100, 200, 300 of the present disclosure can environmentally seal a port of a fiber terminal, enclosure or bulkhead before and after a service connection (i.e. an empty port as well as a port having a cable passing therethrough) with only a simple modification. The exemplary cable sealing devices allow the service provider to extend their fiber networks closer to the end user using simpler cable installation protocols as well as reducing the number of parts that need to be ordered for a given installation reducing cost and waste created during the installation process.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

What is claimed is:

1. A cable sealing device for a port structure in a telecommunication terminal, enclosure or bulkhead, the sealing device comprising:
a unibody construction comprising a rigid body portion, the rigid portion having a generally tubular shape that includes an interior passageway extend from a first end to a second end of the rigid body portion; and
an elastomeric body portion overmolded onto and extending from an end of the rigid body portion, the elastomeric body portion comprises a front end having an interior sleeve that extends into interior passageway at the second end of rigid body portion and an exterior sealing sleeve that is formed over the second end of rigid body portion, an elastomeric tongue extending from the front end, and a closed end disposed opposite the open end, wherein the closed end includes a removable portion, wherein the elastomeric tongue has an exposed surface and wherein the exposed surface provides an anti-slip or friction surface that improves the retention of a cable that is secured to the cable retention device.

2. A cable sealing device for a port structure in a telecommunication terminal, enclosure or bulkhead, the sealing device comprising:
a unibody construction comprising a rigid body portion, the rigid portion having a generally cylindrical shape that includes an interior passageway extend from a first end to a second end of the rigid body portion; and
an elastomeric body portion extending from an end of the rigid body portion, the elastomeric body portion comprises a front end having an exterior sealing sleeve that is formed over the second end of rigid body portion, an elastomeric tongue extending from the front end of the elastomeric body portion and through the interior passageway in the rigid body portion, and a closed end disposed opposite the open end, wherein the closed end includes a removable portion,
wherein the elastomeric tongue has an exposed surface and wherein the exposed surface provides an anti-slip or friction surface that improves the retention of a cable that is secured to the cable retention device.

3. The sealing device of claim 2, wherein the rigid body portion further comprises a depression formed in the rigid body portion and extending through the interior passageway accommodate and hold elastomeric tongue.

4. The sealing device of claim 2, further comprising interlocking features in the elastomeric body portion and the rigid body portion to prevent separation of the elastomeric body portion and the rigid body portion.

5. The sealing device of claim 4, wherein the interlocking features includes a combination of locking ridges locking holes, locking depressions and/or locking tabs.

6. The sealing device of claim 2, further comprising an external sealing member disposed in a groove formed in an exterior surface of the rigid body portion.

7. The sealing device of claim 2, wherein the external sealing member is part of the unibody construction and is formed with the elastomeric body portion.

8. The sealing device of claim 2, wherein at least one of the exterior sealing sleeve and the second end of the rigid body portion includes a keying feature configured to engage with the port structure in to ensure proper alignment or provide an anti-rotation property to the cable sealing member when is disposed in the port structure.

9. The sealing device of claim 8, wherein the keying feature comprises a hexagonally shaped external profile.

10. The sealing device of claim 2, wherein the rigid body portion further comprises a retention device to strain relieve a cable passing through the cable sealing device.

11. The sealing device of claim 10, wherein a cable tie can be fastened around the retention device and the jacket of the cable passing through the cable sealing device to strain relieve the cable.

12. The sealing device of claim 10, wherein strength members of the cable can be secured to the retention device by one of a cable tie, a clip, or a lug.

13. The sealing device of claim 2, wherein the rigid body portion further comprises a pair of cantilevered arms formed on opposite sides of the rigid body portion to secure the cable sealing device in the port of the telecommunication enclosure, terminal or bulkhead.

14. The sealing device of claim 2, wherein the elastomeric body portion is a single part made of a resilient material.

15. The sealing device of claim 14, wherein the resilient material is one of acrylonitrile butadiene rubber, a silicone rubber, an ethylene propylene diene monomer rubber and a thermoplastic elastomer.

16. The sealing device of claim 14, wherein the resilient material has a Shore A hardness from about 30 to about 50.

17. The sealing device of claim 2, wherein the elastomeric body portion further comprises an inclined sealing face disposed near the front end of the exterior sealing sleeve, wherein the inclined face is configured to seal against the port structure to provide an environmental seal.

18. A method of making a service connection, comprising:
providing a fiber terminal having a plurality of ports, and a cable sealing device removably disposed in the at least one of the plurality of ports, wherein the sealing device has a unibody construction comprising a rigid body portion, the rigid portion having a generally tubular shape that includes an interior passageway extend from a first end to a second end of the rigid body portion and an elastomeric body portion connected to the second end of the rigid body portion, the elastomeric body portion having a closed end at an end opposite the rigid body portion, wherein the closed end includes a removable portion;
extracting the sealing device from the port by exerting an extraction force away from the fiber terminal;
tearing the removable portion away from the closed end of the sealing device to create an insertion opening;
inserting the terminal end of a cable through the insertion opening of the sealing device;
installing the sealing plug back into one of the plurality of ports.

19. The method of claim 18, further comprising the steps of preparing the terminal end of the cable and making a signal connection.

* * * * *

UNITED STATES PATENT AND TRADEMARK OFFICE
CERTIFICATE OF CORRECTION

PATENT NO. : 11,520,115 B2
APPLICATION NO. : 17/107754
DATED : December 6, 2022
INVENTOR(S) : Donald Kent Larson et al.

Page 1 of 1

It is certified that error appears in the above-identified patent and that said Letters Patent is hereby corrected as shown below:

In the Claims

In Column 12, Line 34, Claim 5, delete "ridges" and insert -- ridges, --.

Signed and Sealed this
Twenty-seventh Day of June, 2023

Katherine Kelly Vidal
*Director of the United States Patent and Trademark Office*